April 11, 1961 C. W. DUNNET 2,978,811
BUTTER PAT SLICER
Filed Oct. 22, 1959

*INVENTOR.*
CHARLES W. DUNNET
BY Frank Kahn
ATTORNEY

United States Patent Office 2,978,811
Patented Apr. 11, 1961

2,978,811
BUTTER PAT SLICER
Charles W. Dunnet, 3 E. Lodges Lane, Cynwyd, Pa.
Filed Oct. 22, 1959, Ser. No. 848,138
4 Claims. (Cl. 31—21)

This invention relates to a butter slicer, and more particularly relates to a manually operated butter patty slicer and holder in which a quarter-pound cake of butter may be stored and butter patties rapidly and efficiently sliced therefrom.

This application is a continuation-in-part of my co-pending patent application, Serial No. 739,789, filed May 29, 1958, and also a continuation-in-part of my co-pending patent application, Serial No. 828,084, filed July 20, 1959.

In the setting of a table at home, it is frequently desirable for the housewife to serve individual butter patties rather than the large quarter-pound or full pound cakes of butter. This practice is not only hygienic, but also economical since it avoids the necessity of serving appreciable quantities of butter in excess of the family needs. However, it is well recognized that a housewife experiences considerable difficulty in cutting by hand by means of a knife, individual butter patties which are uniform in thickness and contour and in avoiding touching of the butter itself by the hands.

In order to overcome this difficulty, it is an object of my invention to construct a butter patty dispenser which will provide sanitary service of individual butter patties cut therein.

Another object of my invention is to provide a butter patty slicer which will hold a quarter-pound cake of butter for storage in a refrigerator and from which a succession of uniform butter patties may be cut and individually dispensed therefrom.

Another object of my invention is to provide a butter patty slicer for discharging individual butter patties upon a plate without the necessity of the housewife touching the butter.

Still another object of my invention is to provide a butter patty slicer whereby the cake of butter may be stored therein during refrigeration and thereafter dispensed sanitarily while cold, even by a child.

A further object of my invention is to provide a butter patty slicer for holding a quarter-pound cake of butter and for cutting therefrom individual butter patties whenever they are desired.

Other objects of my invention are to provide an improved device of the character described, that is easily and economically produced, that is sturdy in construction and which is highly efficient in operation.

With the above and related objects in view, my invention consists in the details of construction and combination of parts which will be more fully understood from the following description when read in conjunction with the accompanying drawings, in which.

Figure 1:
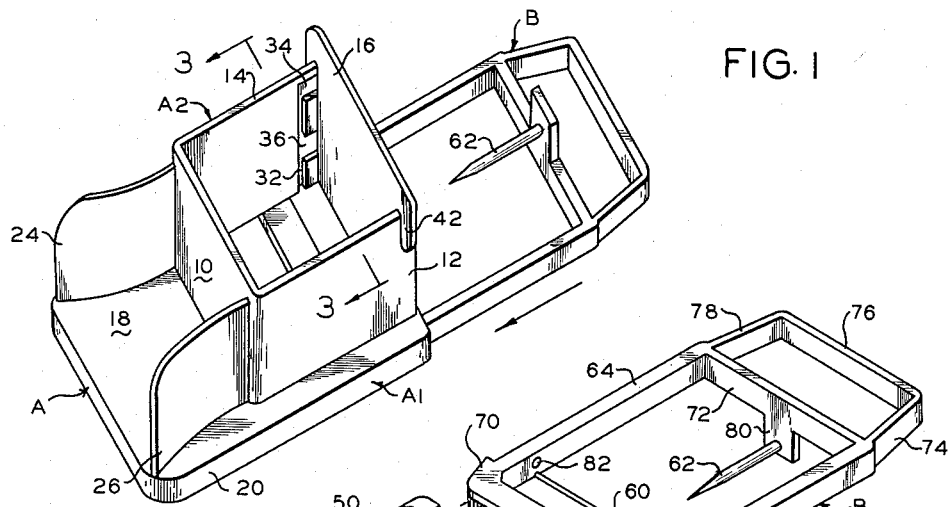
Fig. 1 is a perspective view of my butter patty slicer embodying the invention.
Figure 2:
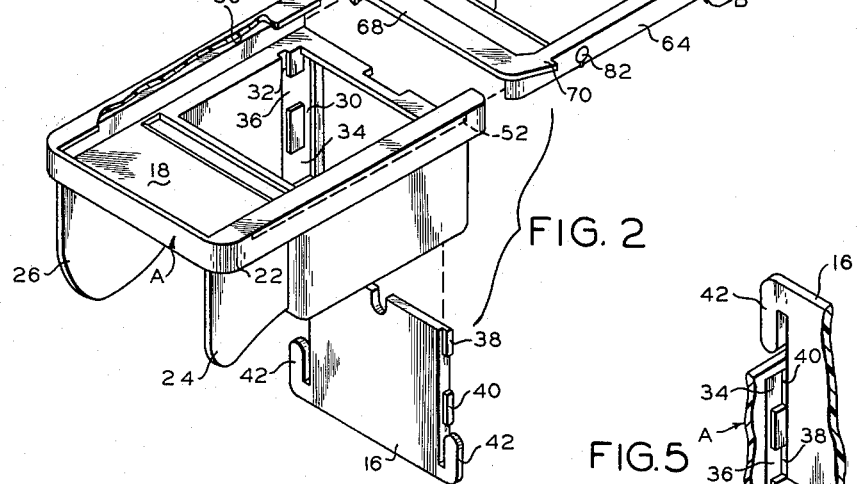
Fig. 2 is an exploded bottom perspective view of the butter patty slicer of Fig. 1.

Referring now to the drawing, I have shown in Fig. 1 a butter patty slicer comprising a housing, generally designated as A, which is preferably integrally molded of plastic material, and a slicer member or slide, generally designated as B, slidably engaged in a bottom compartment A1 of the housing A and extending forwardly thereof.

The upper part of the housing A comprises a rectangular vertical chimney A2 having a fixed rear wall 10, fixed side walls 12 and 14, and a front wall 16, subsequently to be described in detail, which may be adjusted into either of two positions in order to accommodate different sizes of cakes of butter. The compartment A1 has a roof portion 18 which is apertured toward the front to receive the chimney A2 and has verticle side walls 20 and 22. Grip members 24 and 26 are curved vertical walls which are attached to the rear wall 10 respectively adjacent its lateral edges and to the top surface of the roof 18 and they extend divergently rearward to the rearward corners of the compartment A1. Grips 24 and 26 are adapted to be conveniently grasped with the thumb and fingers of one hand while the slide member B is operated with the other.

Figure 5:
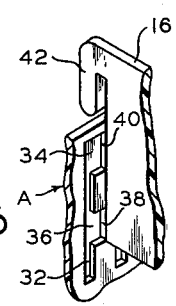
Fig. 5 is a fragmentary perspective view of the adjustable front wall of the slicer while being shifted between its two limiting positions.

Adjacent the front edges of the walls 12 and 14, their inner surfaces are each provided with a pair of vertical slots, a forward slot 30 and a rearward slot 32 terminating just below the tops of these walls. The slots 30 and 32 are connected at their tops and at an intermediate height by wide horizontal slots 34 and 36. The adjustable wall 16 has lateral extensions 38 and 40 on either side at the bottom and at an intermediate height, respectively, which are engageable in either the slots 30 or 32, as desired. The heights of the extensions 38 and 40 are slightly less than the widths of the slots 34 and 36 which are so located with respect to these extensions that the wall 16 may be shifted from a forward position in which the extensions are engaged in the slots 30 to a rearward position in which the extensions are engaged in the slots 32, by raising the wall 16 until the extensions 40 and 38 are aligned with the horizontal slots 34 and 36, as illustrated in Fig. 5. The wall 16 extends above the fixed chimney walls and is provided with hook projections 42 which limit the downward movement of the wall 16 and extend on each side laterally outward and then downward to engage the respective side walls for a short vertical distance when the wall 16 is in its lowest position. The hooks 42 are of such height that they clear the walls 12 and 14 when the wall 16 is in its highest position as shown in Fig. 5, so that the walls 12 and 14 may be resiliently sprung apart for the insertion or removal of the wall 16 from the housing A.

The walls 20 and 22 are turned inwardly under to form supporting ledges and guides for the slide B and have grooves 50 which extend longitudinally along the inner vertical portions of these walls. The grooves 50 do not extend completely to the front end of walls 20 and 22, thus forming a stop 52.

The slide B is preferably of integrally molded plastic material with the exception of a stainless steel filament cutter 60 and a holding spike member 62. The slide B comprises side walls 64, a rear transverse bottom platform 68 connecting the side walls 64 and having laterally extending ears 70, a cross piece 72 joining the front ends of the side walls 64, and a trapezoidal handle defined by sides 74, 76 and 78 extending forwardly of the crosspiece 72. The crosspiece 72 is provided with a central upward extension 80 from which the spike 62 projects rearwardly. The cutter 60 is forward of and adjacent to the shelf or platform 68, extending laterally across and level with the top of the slide B by lying in suitable lateral grooves in the tops of the walls 64, and is fastened to said walls by rivets 82.

The ears 70 engage the grooves 50 and serve to prevent complete withdrawal of the slide B from the compartment A1 by abutting the stop 52 to limit forward movement. The slide B is inserted in the compartment A1 by resiliently springing the free front ends of the walls 20 and 22 laterally outward until the ears 70 may be forced rearwardly past the stop 52.

Figure 4:
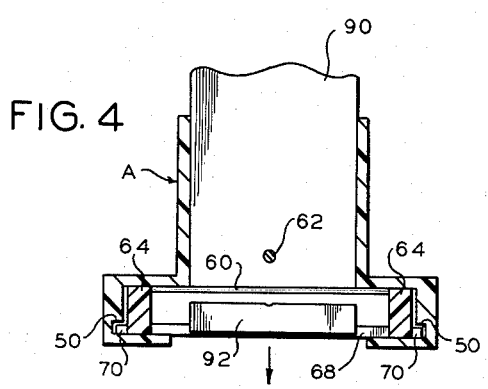
Fig. 4 is a fragmentary sectional view, similar to Fig. 3, showing a butter patty falling after it has been sliced.
Figure 3:
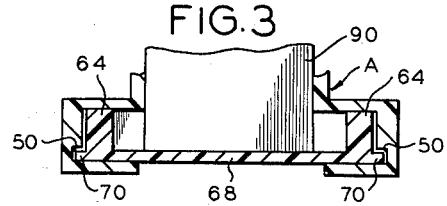
Fig. 3 is a fragmentary section on the line 3—3 of Fig. 1.

The operation of the device is as follows. The adjustable wall 16 is positioned in the slot 30 or 32 to accommodate the size of the cake of butter 90 which is to be used. With the slide B in forwardly extended position, the cake of butter is placed in the chimney A2 resting upon the shelf 68 and the housing A is grasped with one hand by means of the grips 24 and 26. By grasping the handle with the fingers of the other hand, the slide B is pushed rearwardly into the compartment A1. This action causes the cutter 60 to shear the cake of butter to form a patty, but well before severance the spike 62 penetrates the front side of the cake 90. When the slicing is completed, the patty 92 drops through the slide B and the compartment A1, as illustrated in Fig. 4 and may be caught in any suitable receptacle, the cake 90 being prevented from falling through by the spike 62. When the slide B is retracted forwardly to make ready for slicing the next patty, first the spike 62 and then the cutter 60 disengages from the cake 90 which then drops down upon the platform or shelf 68 in readiness for cutting the succeeding patty of butter.

The spike 62 is positioned so that it is as far above the cutter 60 as the platform 68 is below it so that the spike indentations in the cake of butter coincide with the next succeeding cut of the cutter, thus minimizing deformation of the patties by the spike. Also, although I have illustrated the spike 60 as a pointed cylinder, it may instead be a flat knife blade which will not mar the patties and may be of plastic or other suitable material as well as metal.

It is obvious that neither the butter patties nor the cake of butter 90 after it has once been placed in the chimney A2 need be touched by the hand. Furthermore, the butter cake may remain in my slicer while being stored in the refrigerator. Should it be desired at any time to clean the slicer, particles of butter may be washed off with hot water.

Although my invention has been described in considerable detail, such description is intended as illustrative rather than limiting, as the invention may be variously embodied, and the scope of the invention is to be determined by the spirit of the appended claims.

I claim:

1. A butter pat slicing device comprising a generally rectangular base defined by oppositely disposed longitudinal side walls, an end wall at one end, and a top wall, the opposite end and the bottom of said base being open, an aperture in said top wall, an open-ended, vertical hopper extending upwardly from said aperture for holding a cake of butter, said hopper being defined by a plurality of side walls, two of said side walls being in oppositely disposed positions, said oppositely disposed side walls each having a plurality of slots spaced from each other longitudinally thereof, the slots on one of said oppositely disposed side walls being aligned with the corresponding slots on the other of said oppositely disposed side walls, a removable side wall plate extending between said aforementioned oppositely disposed side walls and selectively positioned between aligned slots on said oppositely disposed side walls whereby said plate is adjustable to selectively increase and decrease the area of said hopper, oppositely disposed flanges extending toward each other from said longitudinal side walls of said base, a slicing means slidable on said flanges in said base through the open end of said base, said slicing means being substantially open and defined by a generally rectangular frame adapted to slidably fit within said base, said slicing means having a handle at one end and a platform at the opposite end, a cutter extending transversely across said frame adjacent to but spaced inwardly of said platform and between said platform and said handle, an upwardly projecting extension on said frame adjacent said handle, and a piercing member having one end fixed to said extension, and having its opposite end extending toward but spaced from said cutter.

2. The invention of claim 1 characterized in that said slicing means and said base have cooperating stop means to limit forward movement of said slide, whereby with the slicing means in extreme forward position a cake of butter in said hopper will rest upon said platform, and upon rearward movement of said slicing means said cutter will slice a cake of butter held in said hopper to produce a butter pat and said piercing member will penetrate said cake before severance of said pat.

3. The invention of claim 1 in which the vertical spacing between said platform and said cutter is equal to the vertical spacing between said cutter and said piercing member.

4. The invention of claim 1 wherein the base is provided with grip members for holding the butter pat slicing device in the hand, said grip members comprising a pair of divergently curved vertical walls attached to the adjacent wall of said hopper adjacent its respective lateral edges and to the top of said base.

References Cited in the file of this patent
UNITED STATES PATENTS

| 2,285,637 | Weiler | June 9, 1942 |
| 2,718,701 | Fromwiller | Sept. 27, 1955 |